(No Model.)
M. V. DE WITT.
CULTIVATOR.
No. 405,204. Patented June 11, 1889.
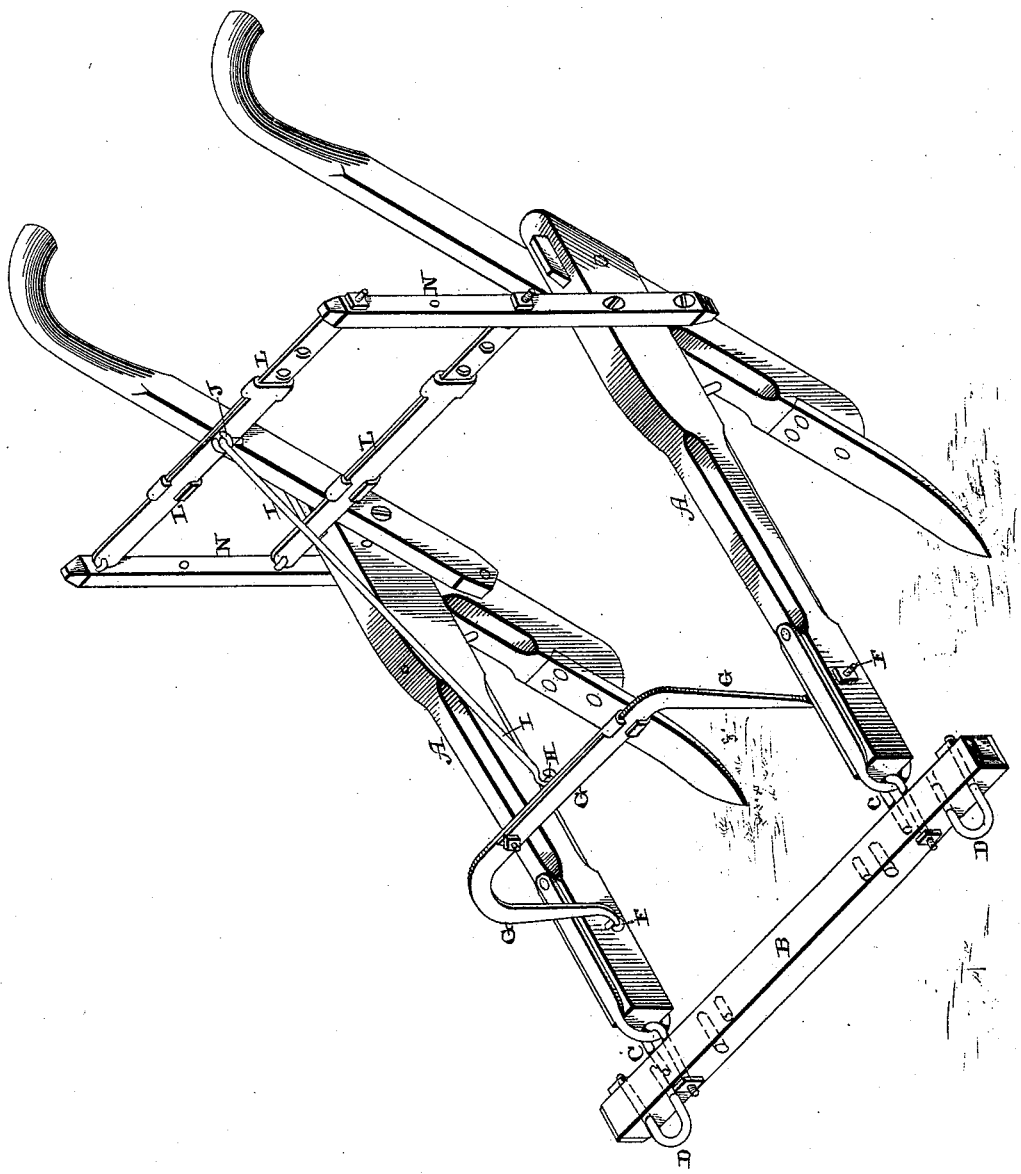
Witnesses:
E. P. Ellis
L. L. Burket
Inventor:
Martin V. De Witt,
per
F. A. Lehmann,
Atty.

UNITED STATES PATENT OFFICE.

MARTIN V. DE WITT, OF PARIS, TEXAS.

CULTIVATOR.

SPECIFICATION forming part of Letters Patent No. 405,204, dated June 11, 1889.

Application filed February 13, 1889. Serial No. 299,772. (No model.)

*To all whom it may concern:*

Be it known that I, MARTIN V. DE WITT, of Paris, in the county of Lamar and State of Texas, have invented certain new and useful Improvements in Cultivators; and I do hereby declare the following to be a full, clear, and exact description of the invention, such as will enable others skilled in the art to which it pertains to make and use it, reference being had to the accompanying drawing, which forms part of this specification.

My invention relates to an improvement in cultivators; and it consists in the combination of two separate cultivators which are attached at their front ends to a draft-bar, a connecting rod or bar which connects the two beams together at any suitable distance from their front ends, vertical standards which are secured to the rear ends of the beams, adjustable connecting-bars which extend across between the standards, and a connecting-rod which connects the bars together in a line with the beams, as will be more fully described hereinafter.

The object of my invention is to loosely attach two cultivators to a single draft-bar, and then connect these two cultivators together near their front ends in such a manner that each of the cultivators has a universal movement independently of the other, and yet they are always kept at about the same distance apart.

The accompanying drawing represents a perspective of a cultivator which embodies my invention.

A represents two ordinary cultivators, which are loosely attached at their front ends to the draft-bar B. Through this draft-bar are made a series of holes and recesses in the rear edge of the bar, so that the hooks C, to which the cultivators are attached, can be adjusted back and forth at the will of the operator, so as to adapt the beams to any width of rows.

To each of the outer ends of the draft-bar B is detachably secured a hook D, to which the draft-animals are fastened.

At a suitable distance from the front end of each cultivator A is secured an eyebolt or hook F, to which the ends of the connecting rod or bar G are fastened. This connecting rod or bar G is made in two parts, which are freely adjustable upon each other, so that the bar can be adjusted to the distance between the beams. To one of the parts of this bar G is secured an eye or ring H, and fastened to this eye is a connecting-rod I which extends backward and is made to catch in a corresponding hook or eye J, fastened to the upper one of the two connecting-rods L, which are attached to the upper ends of the standards N, which are secured at their lower ends to the upper sides of the beams A. These connecting-rods L are also made in two parts, and these parts are freely adjustable upon each other, so as to regulate the distance that the cultivators are to be separated. These two connecting-rods L at the rear ends of the beams and the one H at the front ends of the beams regulate the distance between the furrows, and yet allow each beam a free universal movement of its own, so that either one of the cultivators can be raised above an obstruction or allowed to run into a depression without interfering with the operation of the other. The connecting-rod H is placed between the front ends of the beams, so as to prevent any divergence between the beams at this point caused by the movement of the draft-animals.

Heretofore the draft-animals have been attached to separate draft-bars or attachments connected to each end of the beams, and the slightest divergence of the draft-animal from a straight line causes the cultivator to also diverge from a straight line, and thus produce uneven work. By placing the connecting-rod H between the front ends of the beams, as here shown, and connecting the front ends of the beams together by a draft-bar, this trouble is entirely done away with, and the cultivators are kept at the same distance apart and made to do much better work than they otherwise would.

Having thus described my invention, I claim—

The combination of the two cultivators, a draft-bar to which both of the cultivators are attached, a connecting-rod H, placed between the front ends of the beams, standards secured to the rear ends of the beams, connecting-rods for connecting the upper ends of the standards together, and a connecting-rod I, which extends parallel with the beams and connects the cross-bars together, substantially as shown and described.

In testimony whereof I affix my signature in presence of two witnesses.

MARTIN V. DE WITT.

Witnesses:
D. REILLEY,
J. J. EARLY.